United States Patent
Jia et al.

(10) Patent No.: US 12,412,286 B2
(45) Date of Patent: Sep. 9, 2025

(54) POINT CLOUD REGISTRATION METHOD, APPARATUS, DEVICE AND STORAGE MEDIUM

(71) Applicant: Beijing Baidu Netcom Science Technology Co., Ltd., Beijing (CN)

(72) Inventors: Qingyuan Jia, Beijing (CN); Junjie Cai, Beijing (CN); Kai Zhong, Beijing (CN); Jianzhong Yang, Beijing (CN); Tongbin Zhang, Beijing (CN); Zhen Lu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 393 days.

(21) Appl. No.: 17/973,871

(22) Filed: Oct. 26, 2022

(65) Prior Publication Data

US 2023/0052072 A1 Feb. 16, 2023

(30) Foreign Application Priority Data

Jan. 13, 2022 (CN) .......................... 202210035651.9

(51) Int. Cl.
G06T 7/30 (2017.01)
G06T 7/10 (2017.01)
G06T 7/33 (2017.01)

(52) U.S. Cl.
CPC ............... G06T 7/30 (2017.01); G06T 7/10 (2017.01); *G06T 2207/10028* (2013.01)

(58) Field of Classification Search
CPC ... G06T 7/30; G06T 7/10; G06T 2207/10028; G06T 2207/30252; G06T 7/33; G06T 7/337; G06T 2207/30256
See application file for complete search history.

(56) References Cited

U.S. PATENT DOCUMENTS

2019/0188872 A1 6/2019 Aflalo et al.
2019/0290365 A1* 9/2019 Gao .................. A61B 34/20
(Continued)

FOREIGN PATENT DOCUMENTS

CN 109272523 A * 1/2019 ............ G06T 7/136
CN 109345620 A 2/2019
(Continued)

OTHER PUBLICATIONS

Lin et al., "Point Cloud Registration Algorithm Combined Gaussian Mixture Model and Point-to-Plane Metric," Journal of Computer-Aided Design & Computer Graphics, vol. 30, No. 4, Apr. 2018, 9 pages.

*Primary Examiner* — Amandeep Saini
*Assistant Examiner* — Andrew S Budisalich
(74) *Attorney, Agent, or Firm* — Seed Intellectual Property Law Group LLP

(57) ABSTRACT

A point cloud registration method, apparatus, device, and storage medium are provided. The method includes: acquiring target point cloud data; dividing the target point cloud data into a plurality of point cloud sets; determining a coincidence degree between every two point cloud sets and determining a fixed point cloud set and a registration point cloud set from two point cloud sets with a coincidence degree between the two point cloud sets being greater than a preset threshold; determining a target registration matrix between the fixed point cloud set and the registration point cloud set; and performing registration of the fixed point cloud set with the registration point cloud set according to the target registration matrix.

16 Claims, 6 Drawing Sheets

(56) References Cited

U.S. PATENT DOCUMENTS

| | | | | |
|---|---|---|---|---|
| 2020/0388004 A1* | 12/2020 | Zhang | ................... | G06T 7/33 |
| 2020/0394841 A1* | 12/2020 | Kaino | ................... | G06T 19/006 |
| 2021/0334987 A1* | 10/2021 | Wang | ................... | G06T 7/251 |
| 2022/0050210 A1* | 2/2022 | Ma | ................... | G06V 10/26 |

FOREIGN PATENT DOCUMENTS

| | | | | | |
|---|---|---|---|---|---|
| CN | 109493375 | A | | 3/2019 | |
| CN | 111553936 | A | | 8/2020 | |
| CN | 111612841 | A | | 9/2020 | |
| CN | 107341804 | B | * | 11/2020 | |
| CN | 111986239 | A | | 11/2020 | |
| CN | 112894209 | A | * | 6/2021 | |
| CN | 113016007 | A | * | 6/2021 | ............... B60R 1/24 |
| CN | 113344986 | A | | 9/2021 | |
| CN | 113436238 | A | | 9/2021 | |
| CN | 113902782 | A | | 1/2022 | |
| CN | 109345523 | B | * | 8/2022 | ......... G01N 21/8851 |
| DE | 10 2021 102 643 | A1 | | 8/2021 | |
| WO | 2021/218620 | A1 | | 11/2021 | |

* cited by examiner

POINT CLOUD REGISTRATION METHOD, APPARATUS, DEVICE AND STORAGE MEDIUM

CROSS-REFERENCE TO RELATED APPLICATIONS

The present application claims the priority of Chinese Patent Application No. 202210035651.9, titled "POINT CLOUD REGISTRATION METHOD, APPARATUS, DEVICE AND STORAGE MEDIUM", filed on Jan. 13, 2022, the content of which is incorporated herein by reference in its entirety.

TECHNICAL FIELD

The present disclosure relates to the field of computer applications, more particularly, to autonomous driving and deep learning techniques in the field of artificial intelligence, and more particularly, to a point cloud registration method, apparatus, a device, and a storage medium.

BACKGROUND

As an important part of an autonomous driving system, high-definition maps are one of key factors promoting the development of autonomous driving. Conventional maps have a low accuracy and can only provide road-level route planning. By providing high-precision positioning, a lane-level route planning capability, and rich road-element information, a high-definition map can help to obtain location information in advance, accurately plan a driving route, predict complex road surface information, to better avoid potential risks, and the like.

Construction of a high-definition map relies on an on-board mobile measurement technique. The on-board mobile measurement is a relatively mature manner of mapping and collecting, in which image and point cloud data of the real world is collected through mobile measurement, and the data is processed to complete construction of geographical information of the real world. Therefore, how to accurately register the point cloud data is a key to construct the high-definition maps.

SUMMARY

The present disclosure provides a point cloud registration method, apparatus, device, and storage medium.

Some embodiments of the present disclosure provide a point cloud registration method, comprising: acquiring target point cloud data; dividing the target point cloud data into a plurality of point cloud sets; determining a coincidence degree between every two point cloud sets and determining a fixed point cloud set and a registration point cloud set from two point cloud sets with a coincidence degree between the two point cloud sets being greater than a preset threshold; determining a target registration matrix between the fixed point cloud set and the registration point cloud set; and performing registration of the fixed point cloud set with the registration point cloud set according to the target registration matrix.

Some embodiments of the present disclosure provide a point cloud registration apparatus comprising: a point cloud acquiring unit configured to acquire target point cloud data; a point cloud dividing unit configured to divide the target point cloud data into a plurality of point cloud sets; a coincidence degree determining unit configured to determine a coincidence degree between every two point cloud sets and determine a fixed point cloud set and a registration point cloud set from two point cloud sets with a coincidence degree between the two point cloud sets being greater than a preset threshold; a matrix determining unit configured to determine a target registration matrix between the fixed point cloud set and the registration point cloud set; and a point cloud registering unit configured to perform registration of the fixed point cloud set with the registration point cloud set according to the target registration matrix.

Some embodiments of the present disclosure provide an electronic device including: at least one processor; and a memory communicatively connected to the at least one processor; where the memory stores instructions executable by the at least one processor, and the instructions are executed by the at least one processor, such that the at least one processor can execute the above method.

Some embodiments of the present disclosure provide a non-transitory computer readable storage medium storing computer instructions is provided, where the computer instructions are used for causing the above computer to execute the above method.

Some embodiments of the present disclosure provide a computer program product including a computer program, where the computer program, when executed by a processor, implements the above method.

It is to be understood that the description in this section is not intended to identify key or critical features of the embodiments of the disclosure, nor is it intended to limit the scope of the disclosure. Other features of the present disclosure will become readily apparent from the following description.

BRIEF DESCRIPTION OF THE DRAWINGS

The drawings are for a better understanding of the present disclosure and do not constitute a limitation of the present disclosure, where.

DETAILED DESCRIPTION OF EMBODIMENTS

The following description of exemplary embodiments of the present disclosure, taken in conjunction with the accompanying drawings, includes various details of embodiments of the present disclosure to facilitate understanding, and is to be considered as exemplary only. Accordingly, one of ordinary skill in the art will recognize that various changes and modifications may be made to the embodiments described herein without departing from the scope and spirit of the disclosure. Also, for clarity and conciseness, descriptions of well-known functions and structures are omitted from the following description.

It is noted that the embodiments in the present disclosure and the features in the embodiments may be combined with each other without conflict. The present disclosure will now be described in detail with reference to the accompanying drawings and examples.

Figure 1:
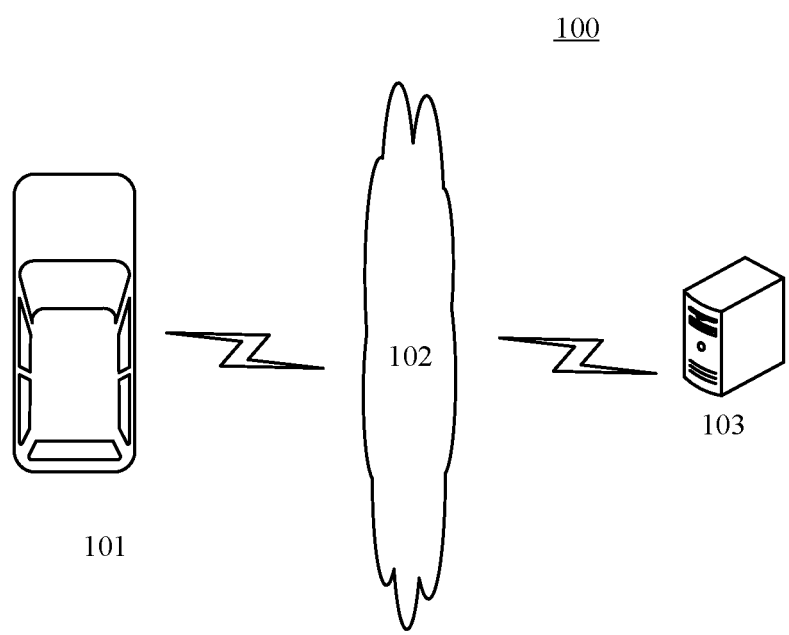
FIG. 1 is an exemplary system architecture diagram in which an embodiment of the present disclosure may be applied.

FIG. 1 illustrates an exemplary system architecture 100 to which an embodiment of a point cloud registration method or a point cloud registration apparatus of the present disclosure may be applied.

As shown in FIG. 1, the system architecture 100 may include an acquisition vehicle 101, a network 102, and a server 103. The network 102 serves to provide a medium of communication links between the acquisition vehicle 101 and the server 103. Network 102 may include various types of connections, such as wired, wireless communication links, or fiber optic cables, among others.

The acquisition vehicle 101 may be provided with a laser radar for acquiring point cloud data of a driving environment. The acquisition vehicle 101 may upload the acquired point cloud data to the server 103 through the network 102 for performing registration on the point cloud data by the server 103.

The server 103 may be a server that provides various services, such as a backend server that registers point cloud data. The backend server may generate a high-definition map using the registered point cloud data and feed back the high-definition map to the acquisition vehicle 101.

It should be noted that the server 103 may be hardware, or may be software. When the server 103 is hardware, the server may be implemented as a distributed server cluster composed of a plurality of servers, or may be implemented as a single server. When the server 103 is software, the server may be implemented as a plurality of software programs or software modules (e.g., software programs or software modules for providing distributed services), or may be implemented as a single software program or software module. This is not specifically limited here.

It should be noted that the point cloud registration method provided in the embodiments of the present disclosure is generally performed by the server 105. Accordingly, the point cloud registration apparatus is generally provided in the server 105.

It should be understood that the number of terminal devices, networks and servers in FIG. 1 is merely illustrative. Any number of terminal devices, networks, and servers may be provided based on actual requirements.

Figure 2:
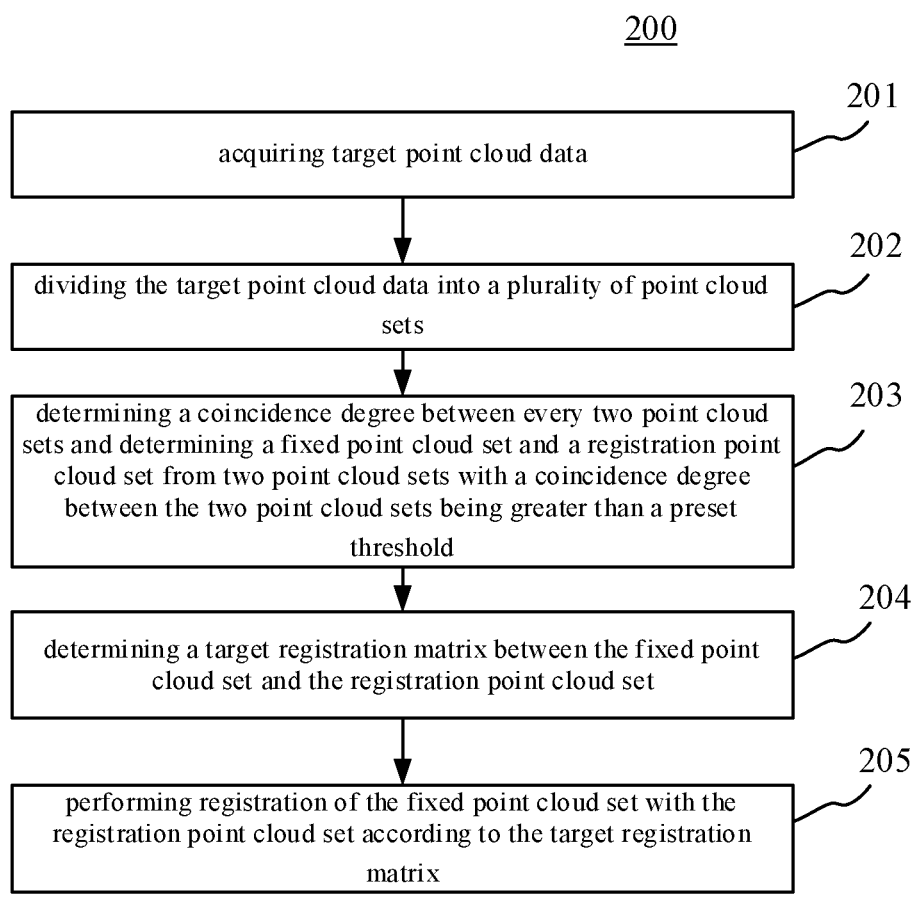
FIG. 2 is a flowchart of a point cloud registration method according to an embodiment of the present disclosure.
Figure 3:
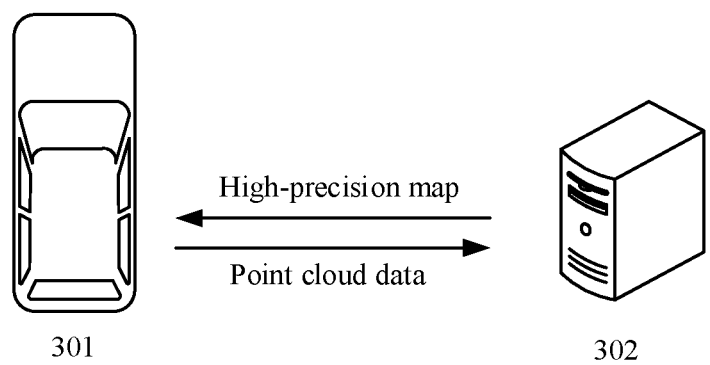
FIG. 3 is a schematic diagram of an application scenario of a point cloud registration method according to the present disclosure.

With further reference to FIG. 2, a flow 200 of a point cloud registration method according to an embodiment of the present disclosure is shown. The point cloud registration method of the present embodiment includes the following step 201 to step 205.

Step 201: acquiring target point cloud data.

In this embodiment, an execution body of the point cloud registration method may first acquire the target point cloud data. Here, the target point cloud data may be point cloud data acquired by a laser radar mounted on an acquisition vehicle in a target area. In some specific practices, the acquisition vehicle may travel on a two-way road of the target area, collect point cloud data twice on a forward road and a reverse road of the two-way road of the target area, thereby avoiding an overpass, a mountain road, a tunnel, and a tree in the target area shielding the point cloud data.

Step 202, dividing the target point cloud data into a plurality of point cloud sets.

After acquiring the target point cloud data, the execution body may perform division on the target point cloud data. Specifically, the execution body may, according to a preset time period t, use point cloud data, acquired per time period t, in the target point cloud data as a point cloud set, thereby obtaining the plurality of point cloud sets. Alternatively, the execution body may, according to a data amount v, take every v point-cloud points in the target point cloud data as a point cloud set, thereby obtaining the plurality of point cloud sets.

Step 203: determining a coincidence degree between every two point cloud sets and determining a fixed point cloud set and a registration point cloud set from two point cloud sets with a coincidence degree between the two point cloud sets being greater than a preset threshold.

After obtaining the plurality of point cloud sets, the execution body can calculate the coincidence degree between every two point cloud sets. Specifically, the execution body may calculate a distance between two point-cloud points in every two point cloud sets. For a single point-cloud point, if there is at least one point-cloud point with a distance away from the single point-cloud point being less than a preset threshold, it is determined that the two point-cloud points coincide with each other. If there is no point-cloud point with a distance away from the single point-cloud point being less than the preset threshold, it is determined that the single point-cloud point does not coincide with any one point-cloud point. The execution body can determine the coincidence degree according to a proportion of coincident point-cloud points coincident with each other to all the point-cloud points in each point cloud set.

It will be appreciated that if a coincidence degree between two point cloud sets is greater than a preset coincidence threshold, the two point cloud sets may be determined to be matched with each other. The execution body may perform registration on the two point cloud sets that are matched with each other. During the registration, the execution body may first determine a fixed point cloud set and a registration point cloud set from the two point cloud sets. Specifically, the execution body may use the point cloud set with a higher precision in the two point cloud sets as the fixed point cloud set, and use the other point cloud set with a lower precision as the registration point cloud set. Alternatively, the execution body may use a point cloud set with a larger proportion of coincident point-cloud points as the fixed point cloud set and the other one as the registration point cloud set.

Step 204, determining a target registration matrix between the fixed point cloud set and the registration point cloud set.

After determining the fixed point cloud set and the registration point cloud set, the execution body may determine the target registration matrix in various manners. Specifically, the execution body may directly select the nearest points in a reference point cloud and a point cloud to be registered to form a corresponding-point set, calculate an average of spatial distance squares of all corresponding-point pairs as an error, and by iteration, determine the target registration matrix when the error satisfies the least squares function.

Step 205, performing registration of the fixed point cloud set with the registration point cloud set according to the target registration matrix.

After determining the target registration matrix, the execution body may perform rigid-body transformation on the registration point cloud set to realize the registration of the fixed point cloud set with the registration point cloud set.

With continuing reference to 3, a schematic diagram of an application scenario of a point cloud registration method according to the present disclosure is shown. In the application scenario of 3, an acquisition vehicle 301 acquires forward point cloud data and reverse point cloud data on a two-way road, and transmit the forward point cloud data and the reverse point cloud data to a server 302. The server 302 perform division according to a preset time period to obtain a plurality of point cloud sets. Two point cloud sets with the highest coincidence degree are determined as corresponding point cloud sets. Then, one of the two corresponding point cloud sets with a higher precision is used as a fixed point cloud set, and the other one is used as a registration point cloud set. A target registration matrix between the two point cloud sets is determined, and registration of the two is performed by using the target registration matrix. Finally, the server 302 generates a high-definition map using the registered point cloud data and transmits the generated high precision-high-definition map to various vehicles for use.

According to the point cloud registration method provided in the above embodiment of the present disclosure, the accuracy of point cloud data registration can be improved.

Figure 4:
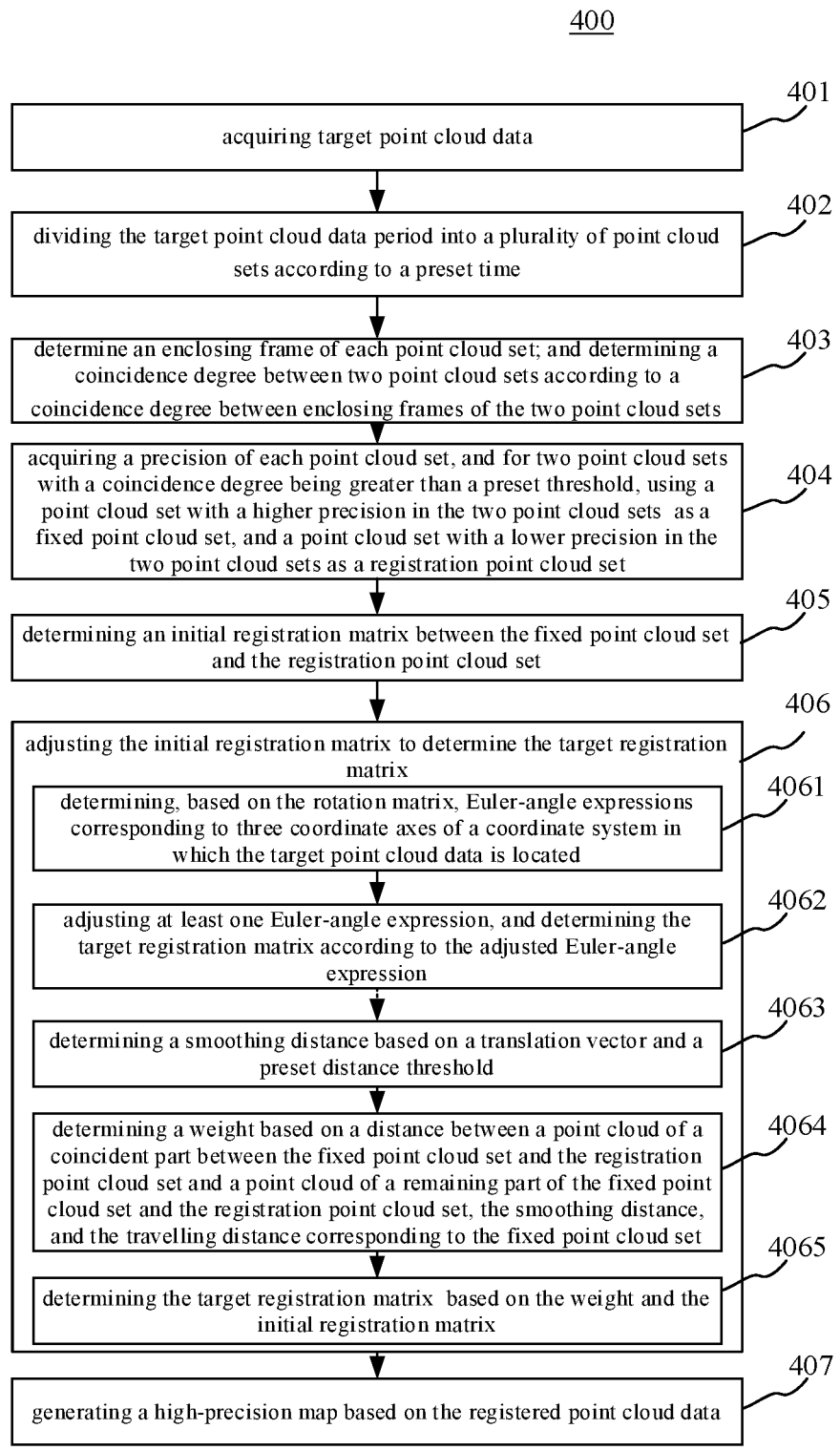
FIG. 4 is a flowchart of a point cloud registration method according to another embodiment of the present disclosure.

With continuing reference to FIG. 4, there is shown a flow 400 of a point cloud registration method according to another embodiment of the present disclosure. As shown in FIG. 4, the method of the present embodiment may include the following step 401 to 407.

Step 401, acquiring target point cloud data.

Step 402, dividing the target point cloud data period into a plurality of point cloud sets according to a preset time.

In this embodiment, the execution body may perform division on the target point cloud data and store a point cloud las file every 10 s after calculation. The target point cloud data is typically in a pcap format, and generally up to a few GB of data can be acquired in an hour. Division can be performed on target pcap data to obtain one pcap per 10 s according to time. The pcap has a data amount of about 40 MB, and a data size is about 300 MB when converted to a las format. If a speed of the acquisition vehicle is 70 km/h (a high speed), the above unit data corresponds to an actual trajectory distance of about 200 m. The data size not only ensures that the amount of data per file is not too large, but also enables a distance covered by each unit to be relatively long and is suitable for subsequent registration.

Step 403, determine an enclosing frame of each point cloud set; and determining a coincidence degree between two point cloud sets according to a coincidence degree between enclosing frames of the two point cloud sets.

The execution body may further determine an enclosing frame for each point cloud set. Here, the enclosing frame can be a three-dimensional structure that can include all the point-cloud points in the point cloud set. For convenience of calculation, the enclosing frame is generally a cuboid. Then, the coincidence degree between two point cloud sets is determined according to the coincidence degree between enclosing frames of the two point cloud sets. Specifically, the execution body may directly use the coincidence degree between the enclosing frames of two point cloud sets as the coincidence degree between the two point cloud sets. Alternatively, the coincidence degree between enclosing frames of two point cloud sets is multiplied by an appropriate reduction coefficient to obtain the coincidence degree between the two point cloud sets.

In some alternative implementations of the present embodiment, the execution body may also perform a filtering operation on the point cloud sets before determining the enclosing frame of each point cloud set. Specifically, the execution body may implement the filtering operation of the point cloud sets by at least one of the following method.

A. For the target point cloud data, each point in the point cloud is first traversed using a radius filter, and the number S of points in a range within a point radius R=10 cm is counted. If the number S of points is smaller than a threshold of 30, it is considered to be an outlier, and the outlier is filtered out.

B. Analyzing is performed on the point cloud data in a mobile measurement scenario. The point cloud data on the ground is large, and features are not obvious, which is not conducive to the registration. Therefore, the point cloud data on the ground needs to be filtered. An absolute height h at which an integrated navigation is installed is obtained according to an output trajectory of the integrated navigation, and point-cloud points with an absolute height below h are filtered out by using the absolute height h as a standard.

C. Finally, the point cloud is filtered again using voxel filtering, which is to divide the point cloud into 1 cm*1 cm*1 cm cube units and a center point of each cube unit, so that the data can be downsampled while preserving a curved surface information of the point cloud, thereby greatly reducing the amount of data.

According to the filtering of the present embodiment, the amount of the point cloud data can be greatly reduced, and a calculation speed can be improved.

Step 404, acquiring a precision of each point cloud set, and for two point cloud sets with a coincidence degree being greater than a preset threshold, using a point cloud set with a higher precision in the two point cloud sets as a fixed point cloud set, and a point cloud set with a lower precision in the two point cloud sets as a registration point cloud set.

In this embodiment, if the coincidence degree of the two point cloud sets is greater than the preset threshold, the two point cloud sets can be considered as matching point cloud set pairs. The execution body may use a point cloud set with a higher precision in the matching point cloud set pair as the fixed point cloud set, and use a point cloud set with a lower precision in the matching point cloud set pair as the registration point cloud set. Here, a precision of a point cloud set can be calculated by a laser radar in an acquisition process and output directly.

Step 405, determining an initial registration matrix between the fixed point cloud set and the registration point cloud set.

In this embodiment, the execution body may first determine the initial registration matrix between the fixed point cloud set and the registration point cloud set by using existing point cloud registration algorithms. The point cloud registration algorithms described above may include, but is not limited to, an ICP (Iterative Closest Point) algorithm.

In some alternative implementations of the present embodiment, the execution body may use the closest points between the fixed point cloud set and the registration point cloud set as corresponding point pairs; perform iteration by using an average of space distance squares of the corresponding point pairs as an error, and determine the initial registration matrix in response to the error satisfying a preset condition.

In the present embodiment, the execution body can calculate the average of the space distance squares of the corresponding point pairs as an error. If the error satisfies the least squares function, it is considered that the error satisfies the preset condition. At this time, the initial registration matrix can be obtained.

Step 406, adjusting the initial registration matrix to determine the target registration matrix.

After the initial registration matrix is obtained, it can be adjusted to use the adjusted registration matrix as the target registration matrix. For example, the execution body may adjust a certain parameter of the above-mentioned initial registration matrix, or multiply the initial registration matrix by a coefficient, or the like.

In some alternative implementations of the present embodiment, the initial registration matrix comprises a rotation matrix. The execution body may adjust the initial registration matrix by step 4061~4062.

Step 4061, determining, based on the rotation matrix, Euler-angle expressions corresponding to three coordinate axes of a coordinate system in which the target point cloud data is located.

Step 4062, adjusting at least one Euler-angle expression, and determining the target registration matrix according to the adjusted Euler-angle expression.

In this implementation, the initial registration matrix may be expressed as:

$$T = \begin{bmatrix} r_{11} & r_{12} & r_{13} & \Delta x \\ r_{21} & r_{22} & r_{23} & \Delta y \\ r_{31} & r_{32} & r_{33} & \Delta z \\ 0 & 0 & 0 & 1 \end{bmatrix}.$$

The matrix can be decomposed into two parts, namely, a rotation matrix R and a translation vector t, i.e.

$$T = \begin{bmatrix} R & t \\ 0^T & 1 \end{bmatrix}$$

Where, $$R = \begin{bmatrix} r_{11} & r_{12} & r_{13} \\ r_{21} & r_{22} & r_{23} \\ r_{31} & r_{32} & r_{33} \end{bmatrix};$$

$$t = \begin{bmatrix} \Delta x \\ \Delta y \\ \Delta z \end{bmatrix}.$$

After obtaining the transformation matrix, in a conventional point cloud registration method, coordinates of the point cloud are generally multiplied by the transformation matrix directly to realize rotation and translation of the entire point cloud. However, in the mobile measurement scenario, after performing data analysis on the trajectory of the integrated navigation, the roll angle of the point cloud data generally changes slightly, and a rotation amount thereof can be set to zero. The Euler angles $\theta_x, \theta_y, \theta_z$ of the three axes x, y, and z are calculated according to the rotation matrix R as follows:

$\theta_x = a \tan 2(r_{32}, r_{33})$;

$\theta_y = a \tan 2(-r_{31}, \sqrt{r_{32}^2 + r_{33}^2})$;

$\theta_z = a \tan 2(r_{21}, r_{11})$.

The roll angle corresponds to $\theta_y$. By setting $\theta_y = 0$, then $R = R_x(\theta_x) * R_y(0) * R_z(\theta_z)$, where $$R_x(\theta) = \begin{bmatrix} 1 & 0 & 0 \\ 0 & \cos\theta & -\sin\theta \\ 0 & \sin\theta & \cos\theta \end{bmatrix};$$

$$R_y(\theta) = \begin{bmatrix} \cos\theta & 0 & \sin\theta \\ 0 & 1 & 0 \\ -\sin\theta & 0 & \cos\theta \end{bmatrix};$$

$$R_z(\theta) = \begin{bmatrix} \cos\theta & -\sin\theta & 0 \\ \sin\theta & \cos\theta & 0 \\ 0 & 0 & 1 \end{bmatrix}.$$

The execution body can perform rigid-body transformation on the registration point cloud set by using the above matrix.

In some alternative implementations of the present embodiment, the execution body may further adjust the initial registration matrix through step 4063~4065 or through step 4061~4062.

Step 4063, determining a smoothing distance based on a translation vector and a preset distance threshold.

Step 4064, determining a weight based on a distance between a point cloud of a coincident part between the fixed point cloud set and the registration point cloud set and a point cloud of a remaining part of the fixed point cloud set and the registration point cloud set, the smoothing distance, and the travelling distance corresponding to the fixed point cloud set.

Step 4065, determining the target registration matrix based on the weight and the initial registration matrix.

Before the transformation, it is also necessary to perform weighting according to a distance from a point in the point cloud to an adjacent point cloud, and then to perform the rigid-body transformation, so as to avoid two adjacent point clouds being disconnected after the registration or road elements changing too abruptly. A point cloud distance range d after the weighting and the transformation is calculated according to the translation vector t. Let $d = \sqrt{\Delta x^2 + \Delta y^2 + \Delta z^2} * 20$, indicating that, if a Euclidean distance of translation is changed by 1 m, smoothing is performed by a point cloud of 20 m.

It is assumed that a distance from a point in the point cloud to a boundary on one side of the point cloud is s, a length range of the point cloud along the travelling trajectory is L, and a weight parameter is $\alpha$.

A formula for calculating the weight is:

$$\alpha = \begin{cases} \dfrac{s}{d}, & s \le d \\ 1, & d < s < L - d \\ \dfrac{L - s}{d}, & L - d \le s \end{cases}$$

In summary, the obtained target registration matrix is $$T = \begin{bmatrix} \alpha R & \alpha t \\ 0^T & 1 \end{bmatrix}.$$

Coordinate transformation is performed on the registration point cloud set according to the target registration matrix, and accurate registration of the point cloud in the mobile measurement is completed.

Step 407, generating a high-definition map based on the registered point cloud data.

In this embodiment, the execution body may also generate a high-definition map based on the registered point cloud data. Since the target point cloud data is fully utilized and the registration accuracy is improved, a generation efficiency and accuracy of the high-definition map are improved.

According to the point cloud registration method provided in the above embodiment of the present disclosure, an amount of data of point clouds involved in registration and calculation can be reduced, thereby improving a calculation efficiency. Further, by performing processing such as smoothing, weighting and the like on the registration matrix, the point cloud registration in the mobile measurement scenario is more efficient and accurate.

Figure 5:
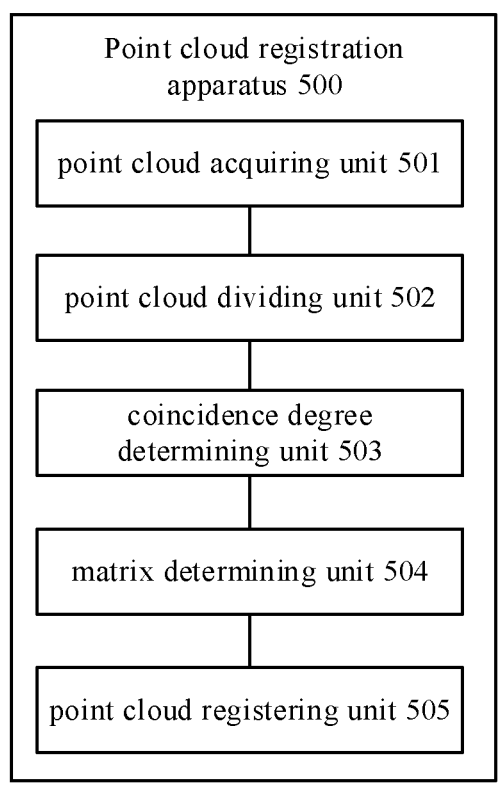
FIG. 5 is a schematic structural diagram of a point cloud registration apparatus according to an embodiment of the present disclosure.

With further reference to FIG. 5, as an implementation of the method shown in each of the above figures, the present disclosure provides an embodiment of a point cloud registration apparatus which corresponds to the method embodiment shown in FIG. 2 and which is particularly applicable to various electronic devices.

As shown in FIG. 5, the point cloud registration apparatus 500 of the present embodiment includes a point cloud acquiring unit 501, a point cloud dividing unit 502, a coincidence degree determining unit 503, a matrix determining unit 504, and a point cloud registering unit 505.

The point cloud acquiring unit 501 is configured to acquire target point cloud data.

The point cloud dividing unit 502 is configured to divide the target point cloud data into a plurality of point cloud sets.

The coincidence degree determining unit 503 is configured to determine a coincidence degree between every two point cloud sets and determine a fixed point cloud set and a registration point cloud set from two point cloud sets with a coincidence degree between the two point cloud sets being greater than a preset threshold.

The matrix determining unit 504 is configured to determine a target registration matrix between the fixed point cloud set and the registration point cloud set.

The point cloud registering unit 505 is configured to perform registration of the fixed point cloud set with the registration point cloud set according to the target registration matrix.

In some alternative implementations of the present embodiment, the matrix determining unit 504 may be further configured to determine an initial registration matrix between the fixed point cloud set and the registration point cloud set; and adjust the initial registration matrix to determine the target registration matrix.

In some alternative implementations of the present embodiment, the matrix determining unit 504 may be further configured to use the closest points between the fixed point cloud set and the registration point cloud set as corresponding point pairs; and perform iteration by using an average of space distance squares of the corresponding point pairs as an error, and determine the initial registration matrix in response to the error satisfying a preset condition.

In some alternative implementations of the present embodiment, the initial registration matrix comprises a rotation matrix. The matrix determining unit 504 may be further configured to determine, based on the rotation matrix, Euler-angle expressions corresponding to three coordinate axes of a coordinate system in which the target point cloud data is located; and adjust at least one Euler-angle expression, and determine the target registration matrix according to the adjusted Euler-angle expression.

In some alternative implementations of the present embodiment, the initial registration matrix includes a translation vector. The matrix determining unit 504 may be further configured to determine a smoothing distance based on the translation vector and a preset distance threshold; determine a weight based on a distance between a point cloud of a coincident part between the fixed point cloud set and the registration point cloud set and a point cloud of a remaining part of the fixed point cloud set and the registration point cloud set, the smoothing distance, and a travelling distance corresponding to the fixed point cloud set; and determine the target registration matrix based on the weight and the initial registration matrix.

In some alternative implementations of the present embodiment, the coincidence degree determining unit 503 may be further configured to determine an enclosing frame of each point cloud set; and determine a coincidence degree between the two point cloud sets according to a coincidence degree between enclosing frames of the two point cloud sets.

In some alternative implementations of the present embodiment, the coincidence degree determining unit 503 may be further configured to perform a filtering operation on the point cloud set to determining the enclosing frame of the filtered point cloud set.

In some alternative implementations of the present embodiment, the coincidence degree determining unit 503 may be further configured to acquire a precision of each point cloud set; and for two point cloud sets with a coincidence degree being greater than the preset threshold, use a point cloud set with a higher precision in the two point cloud sets as a fixed point cloud set, and a point cloud set with a lower precision in the two point cloud sets as a registration point cloud set.

In some alternative implementations of the present embodiment, the point cloud dividing unit 502 may be further configured to divide the target point cloud data according to a preset time period to obtain the plurality of point cloud sets.

In some alternative implementations of the present embodiment, the apparatus 500 may further include a high-definition map generating unit configured to generate the high-definition map based on the registered point cloud data.

It should be understood that each unit 5 described in the point cloud registration apparatus 500 corresponds to each step in the method described in FIG. 2. Thus, the operations and features described above with respect to the point cloud registration method are equally applicable to the apparatus 500 and the units contained therein, and details are not described herein.

In the technical solution of the present disclosure, the processes of collecting, storing, using, processing, transmitting, providing, and disclosing the user's personal information all comply with the provisions of the relevant laws and regulations, and do not violate the public order and good customs.

According to an embodiment of the present disclosure, the present disclosure also provides an electronic device, a readable storage medium, and a computer program product.

Figure 6:
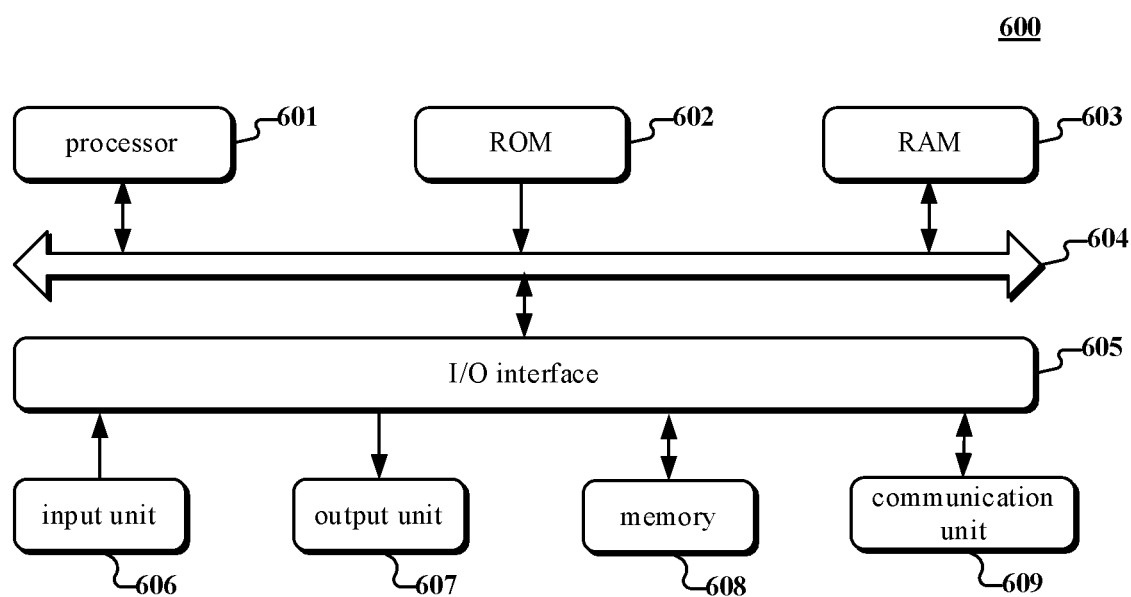
FIG. 6 is a block diagram of an electronic device used to implement a point cloud registration method of an embodiment of the present disclosure.

FIG. 6 shows a block diagram of an electronic device 600 performing a point cloud registration method according to an embodiment of the present disclosure. Electronic devices are intended to represent various forms of digital computers, such as laptop computers, desktop computers, worktables, personal digital assistants, servers, blade servers, mainframe computers, and other suitable computers. Electronic devices may also represent various forms of mobile devices, such as personal digital processing, cellular telephones, smart phones, wearable devices, and other similar computing devices. The components shown herein, their connections and relationships, and their functions are by way of example only and are not intended to limit the implementation of the disclosure described and/or claimed herein.

As shown in FIG. 6, the electronic device 600 includes a processor 601 that may perform various appropriate actions and processes according to a computer program stored in a read-only memory (ROM) 602 or a computer program loaded from a memory 608 into a random access memory (RAM) 603. In RAM 603, various programs and data required for operation of the electronic device 600 may also be stored. The processors 601, ROM 602, and RAM 603 are connected to each other via a bus 604. An I/O interface (input/output interface) 605 is also connected to bus 604.

A plurality of components in the electronic device 600 are connected to the I/O interface 605, including an input unit 606, such as a keyboard, a mouse, and the like; an output unit 607, for example, various types of displays, speakers, and the like; a memory 608, such as a magnetic disk, an optical disk, or the like; and a communication unit 609, such as a network card, a modem, or a wireless communication transceiver. The communication unit 609 allows the electronic device 600 to exchange information/data with other devices over a computer network such as the Internet and/or various telecommunications networks.

The processor 601 may be various general-purpose and/or special-purpose processing components having processing and computing capabilities. Some examples of the processor 601 include, but are not limited to, a central processing unit (CPU), a graphics processing unit (GPU), various specialized artificial intelligence (AI) computing chips, various processors running machine learning model algorithms, digital signal processors (DSPs), and any suitable processors, controllers, microcontrollers, and the like. The processor 601 performs various methods and processes described above, such as point cloud registration methods. For example, in some embodiments, the point cloud registration method may be implemented as a computer software program tangibly embodied in a machine-readable storage medium, such as memory 608. In some embodiments, some or all of the computer program may be loaded and/or installed on the electronic device 600 via the ROM 602 and/or the communication unit 609. When the computer program is loaded into the RAM 603 and executed by the processor 601, one or more steps of the point cloud registration method described above may be performed. Alternatively, in other embodiments, the processor 601 may be configured to perform a point cloud registration method by any other suitable means (e.g., by means of firmware).

The various embodiments of the systems and techniques described above herein may be implemented in a digital electronic circuit system, an integrated circuit system, a field programmable gate array (FPGA), an application specific integrated circuit (ASIC), a special purpose standard product (ASSP), a system on a system on a chip (SOC), a load programmable logic device (CPLD), computer hardware, firmware, software, and/or combinations thereof. These various embodiments may include being implemented in one or more computer programs that may execute and/or interpret on a programmable system including at least one programmable processor, which may be a dedicated or general purpose programmable processor, may receive data and instructions from a memory system, at least one input device, and at least one output device, and transmit the data and instructions to the memory system, the at least one input device, and the at least one output device.

The program code for carrying out the methods of the present disclosure may be written in any combination of one or more programming languages. The program code may be packaged as a computer program product. These program codes or computer program products may be provided to a processor or controller of a general purpose computer, special purpose computer, or other programmable data processing apparatus such that the program code, when executed by the processor 601, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable storage medium may be a tangible medium that may contain or store a program for use by or in connection with an instruction execution system, apparatus, or device. The machine-readable storage medium may be a machine-readable signal storage medium or a machine-readable storage medium. The machine-readable storage medium may include, but is not limited to, electronic, magnetic, optical, electromagnetic, infrared, or semiconductor systems, devices, or devices, or any suitable combination of the foregoing. More specific examples of machine-readable storage media may include electrical connections based on one or more lines, a portable computer disk, a hard disk, a random access memory (RAM), a read only memory (ROM), an erasable programmable read only memory (EPROM or flash memory), an optical fiber, a compact disk read only memory (CD-ROM), an optical storage device, a magnetic storage device, or any suitable combination of the foregoing.

To provide interaction with a user, the systems and techniques described herein may be implemented on a computer having a display device (e.g., a CRT (cathode ray tube) or LCD (liquid crystal display) monitor) for displaying information to the user; And a keyboard and a pointing device (e.g., a mouse or a trackball) through which a user can provide input to a computer. Other types of devices may also be used to provide interaction with a user; For example, the feedback provided to the user may be any form of sensory feedback (e.g., visual feedback, auditory feedback, or tactile feedback); And input from the user may be received in any form, including acoustic input, speech input, or tactile input.

The systems and techniques described herein may be implemented in a computing system including a background component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such background component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by a computer program running on the corresponding computer and having a client-server relationship with each other. The server may be a cloud server, also referred to as a cloud computing server or a cloud host, and is a host product in a cloud computing service system, so as to solve a problem that the conventional physical host and the VPS (Virtual Private Server) service are difficult to manage and have weak service scalability. The server may also be a server of a distributed system or a server incorporating a chain of blocks.

It is to be understood that the steps of reordering, adding or deleting may be performed using the various forms shown above. For example, the steps described in the present disclosure may be performed in parallel or sequentially, and may be performed in a different order, so long as the desired results of the technical solution of the present disclosure can be realized, and are not limited herein.

The foregoing detailed description is not intended to limit the scope of the present disclosure. It will be appreciated by those skilled in the art that various modifications, combinations, subcombinations, and substitutions may be made depending on design requirements and other factors. Any modifications, equivalents, and modifications that fall within the spirit and principles of the disclosure are intended to be included within the scope of protection of the disclosure.

What is claimed is:

1. A point cloud registration method, comprising:
    acquiring target point cloud data;
    dividing the target point cloud data into a plurality of point cloud sets;
    determining a coincidence degree between every two point cloud sets and determining a fixed point cloud set and a registration point cloud set from two point cloud sets with a coincidence degree between the two point cloud sets being greater than a preset threshold;
    determining a target registration matrix between the fixed point cloud set and the registration point cloud set; and
    performing registration of the fixed point cloud set with the registration point cloud set according to the target registration matrix;
    wherein the determining the target registration matrix between the fixed point cloud set and the registration point cloud set comprises:
        determining an initial registration matrix between the fixed point cloud set and the registration point cloud set; and
        adjusting the initial registration matrix to determine the target registration matrix;
    wherein the initial registration matrix comprises a translation vector; and
    adjusting the initial registration matrix to determine the target registration matrix comprises:
        determining a smoothing distance based on the translation vector and a preset distance threshold;
        determining a weight based on a distance between a point cloud of a coincident part between the fixed point cloud set and the registration point cloud set and a point cloud of a remaining part of the fixed point cloud set and the registration point cloud set, the smoothing distance, and a travelling distance corresponding to the fixed point cloud set; and
        determining the target registration matrix based on the weight and the initial registration matrix.

2. The method of claim 1, wherein determining the initial registration matrix between the fixed point cloud set and the registration point cloud set comprises:
    using the closest points between the fixed point cloud set and the registration point cloud set as corresponding point pairs; and
    performing iteration by using an average of space distance squares of the corresponding point pairs as an error, and determining the initial registration matrix in response to the error satisfying a preset condition.

3. The method of claim 1, wherein the initial registration matrix comprises a rotation matrix; and
    adjusting the initial registration matrix to determine the target registration matrix comprises:
        determining, based on the rotation matrix, Euler-angle expressions corresponding to three coordinate axes of a coordinate system in which the target point cloud data is located; and
        adjusting at least one Euler-angle expression, and determining the target registration matrix according to the adjusted Euler-angle expression.

4. The method of claim 1, wherein determining a coincidence degree between every two point cloud sets comprises:
    determining an enclosing frame of each point cloud set; and
    determining a coincidence degree between the two point cloud sets according to a coincidence degree between enclosing frames of the two point cloud sets.

5. The method of claim 4, wherein determining the enclosing frame of each point cloud set comprises:
    performing a filtering operation on the point cloud set to determine an enclosing frame of a filtered point cloud set.

6. The method of claim 1, wherein the determining a registration point cloud set from two point cloud sets with a coincidence degree between the two point cloud sets being greater than a preset threshold comprises:
    acquiring a precision of each point cloud set; and
    for two point cloud sets with a coincidence degree being greater than the preset threshold, using a point cloud set with a higher precision in the two point cloud sets as a fixed point cloud set, and a point cloud set with a lower precision in the two point cloud sets as a registration point cloud set.

7. The method of claim 1, wherein dividing the target point cloud data into a plurality of point cloud sets comprises:
    dividing the target point cloud data according to a preset time period to obtain the plurality of point cloud sets.

8. The method of claim 1, wherein the method further comprises:
    generating a high-definition map based on the registered point cloud data.

9. A point cloud registration apparatus includes:
    at least one processor; and
    a memory storing instructions, wherein the instructions when executed by the at least one processor, cause the at least one processor to perform operations, the operations comprising:
        acquiring target point cloud data;
        dividing the target point cloud data into a plurality of point cloud sets;
        determining a coincidence degree between every two point cloud sets and determining a fixed point cloud set and a registration point cloud set from two point cloud sets with a coincidence degree between the two point cloud sets being greater than a preset threshold;
        determining a target registration matrix between the fixed point cloud set and the registration point cloud set; and
        performing registration of the fixed point cloud set with the registration point cloud set according to the target registration matrix;
        wherein the determining the target registration matrix between the fixed point cloud set and the registration point cloud set comprises:

determining an initial registration matrix between the fixed point cloud set and the registration point cloud set; and adjusting the initial registration matrix to determine the target registration matrix;

wherein the initial registration matrix comprises a translation vector; and adjusting the initial registration matrix to determine the target registration matrix comprises:

determining a smoothing distance based on the translation vector and a preset distance threshold;

determining a weight based on a distance between a point cloud of a coincident part between the fixed point cloud set and the registration point cloud set and a point cloud of a remaining part of the fixed point cloud set and the registration point cloud set, the smoothing distance, and a travelling distance corresponding to the fixed point cloud set; and determining the target registration matrix based on the weight and the initial registration matrix.

10. The apparatus of claim 9, wherein determining the initial registration matrix between the fixed point cloud set and the registration point cloud set comprises:

using the closest points between the fixed point cloud set and the registration point cloud set as corresponding point pairs; and performing iteration by using an average of space distance squares of the corresponding point pairs as an error, and determining the initial registration matrix in response to the error satisfying a preset condition.

11. The apparatus of claim 9, wherein the initial registration matrix comprises a rotation matrix; and adjusting the initial registration matrix to determine the target registration matrix comprises:

determining, based on the rotation matrix, Euler-angle expressions corresponding to three coordinate axes of a coordinate system in which the target point cloud data is located; and adjusting at least one Euler-angle expression, and determining the target registration matrix according to the adjusted Euler-angle expression.

12. The apparatus according to claim 9, wherein determining a coincidence degree between every two point cloud sets comprises:

determining an enclosing frame of each point cloud set; and determining a coincidence degree between the two point cloud sets according to a coincidence degree between enclosing frames of the two point cloud sets.

13. The apparatus according to claim 12, wherein determining the enclosing frame of each point cloud set comprises:

performing a filtering operation on the point cloud set to determine an enclosing frame of a filtered point cloud set.

14. The apparatus according to claim 9, wherein the determining a registration point cloud set from two point cloud sets with a coincidence degree between the two point cloud sets being greater than a preset threshold comprises:

acquiring a precision of each point cloud set; and for two point cloud sets with a coincidence degree being greater than the preset threshold, using a point cloud set with a higher precision in the two point cloud sets as a fixed point cloud set, and a point cloud set with a lower precision in the two point cloud sets as a registration point cloud set.

15. The apparatus of claim 9, wherein dividing the target point cloud data into a plurality of point cloud sets comprises:

dividing the target point cloud data according to a preset time period to obtain the plurality of point cloud sets.

16. A non-transitory computer readable storage medium storing computer instructions, wherein the computer instructions are used for causing the computer to execute operations comprising:

acquiring target point cloud data;

dividing the target point cloud data into a plurality of point cloud sets;

determining a coincidence degree between every two point cloud sets and determining a fixed point cloud set and a registration point cloud set from two point cloud sets with a coincidence degree between the two point cloud sets being greater than a preset threshold;

determining a target registration matrix between the fixed point cloud set and the registration point cloud set; and performing registration of the fixed point cloud set with the registration point cloud set according to the target registration matrix;

wherein the determining the target registration matrix between the fixed point cloud set and the registration point cloud set comprises:

determining an initial registration matrix between the fixed point cloud set and the registration point cloud set; and adjusting the initial registration matrix to determine the target registration matrix;

wherein the initial registration matrix comprises a translation vector; and adjusting the initial registration matrix to determine the target registration matrix comprises:

determining a smoothing distance based on the translation vector and a preset distance threshold;

determining a weight based on a distance between a point cloud of a coincident part between the fixed point cloud set and the registration point cloud set and a point cloud of a remaining part of the fixed point cloud set and the registration point cloud set, the smoothing distance, and a travelling distance corresponding to the fixed point cloud set; and determining the target registration matrix based on the weight and the initial registration matrix.

\* \* \* \* \*